United States Patent [19]

Chan et al.

[11] 4,415,033

[45] Nov. 15, 1983

[54] INVERSE VISCOSITY GRADING

[75] Inventors: Albert F. Chan; Jerry F. Casteel, both of Tulsa, Okla.

[73] Assignee: Standard Oil Company, Chicago, Ill.

[21] Appl. No.: 301,490

[22] Filed: Sep. 14, 1981

[51] Int. Cl.³ .............................................. E21B 43/22
[52] U.S. Cl. ...................... 166/274; 166/275
[58] Field of Search ............... 166/246, 273, 274, 275; 252/8.55 D

[56] References Cited

U.S. PATENT DOCUMENTS

| | | | |
|---|---|---|---|
| 3,406,754 | 10/1968 | Gogarty | 166/273 |
| 3,412,791 | 11/1968 | Gogarty | 166/273 |
| 3,421,582 | 1/1969 | Fallgatter | 166/273 |
| 3,698,479 | 10/1972 | Askew et al. | 166/274 X |
| 3,719,606 | 3/1973 | Froning et al. | 252/308 X |
| 4,013,125 | 3/1977 | Plummer et al. | 166/273 |
| 4,018,281 | 4/1977 | Chang | 166/273 |
| 4,066,126 | 1/1978 | Waite et al. | 166/273 |
| 4,319,636 | 3/1982 | Kudchadker et al. | 166/274 |

*Primary Examiner*—Stephen J. Novosad
*Assistant Examiner*—George A. Suchfield
*Attorney, Agent, or Firm*—Scott H. Brown; Stephen R. May; Fred E. Hook

[57] ABSTRACT

The method of oil recovery for use within a fluid flood comprising grading the viscosity of injected fluids at a low concentrating at the front thereof to a high concentration at the rear thereof to prevent the formation of viscous zones within the injected fluids which reduce oil recovery.

6 Claims, 3 Drawing Figures

INVERSE VISCOSITY GRADING

The present invention relates to fluid flooding to recover oil from a subterranean oil-bearing formation and, more particularly, to such a fluid flood wherein the formation of harmful viscous zones within the injected fluid banks are prevented.

BACKGROUND OF THE INVENTION

In the production of oil from underground oil-bearing formations, it is known that primary recovery methods remove only a small portion of the in-place oil. Secondary oil recovery methods, such as waterflooding, recover substantially more of this oil, but still leave a large quantity of the oil still in place. This in place oil is difficult to remove due to the fact that the interfacial tension between the immiscible phases within the oil results in entrapping the oil in the pores of the formation material. In order to reduce the interfacial tension of the oil, certain fluid additives are usually introduced into the formation; for example, surface active agents are injected to reduce this interfacial tension. These fluids are usually followed by the injection of mobility control solutions having a viscosity sufficient to drive the now mobilized oil towards a producing well. To achieve this viscosity, the fluid bank containing this mobility control solution may include a polymer. In that this polymer is relatively expensive, efforts have been made to develop recovery methods which reduce the amount of polymer needed for the total flood project. One technique is to grade or decrease the concentration of the polymer within the mobility control fluid bank from a high concentration at the front thereof to a low concentration at the rear thereof. This method has had limited success in recovering additional oil; however, some serious drawbacks have developed through this use. The greatest drawback against utilizing this method of decreased grading is that in utilizing a relatively high concentration of the polymer a viscous polymer build-up forms within the injected fluid which plugs the formation, thereby substantially reducing the oil recovery by affecting the mobility control and the sweep efficiency of the injected fluids. One method of preventing the formation of these viscous zones is to reduce the overall concentration of the polymer within the injected fluid banks. By reducing the polymer concentration, the effective recovery yield from the project is obviously reduced. There is a need for a fluid flooding method which substantially reduces or eliminates the formation of these viscous zones, as well as reduces the amount of polymer needed for the project while maintaining the integrity of the mobility control.

SUMMARY OF THE INVENTION

The present invention contemplates an improved method of oil recovery from a subterranean oil-bearing formation, which is particularly designed to overcome the foregoing disadvantages. The method of the present invention comprises introducing an aqueous fluid bank into the formation to reduce the interfacial tension of the oil, followed by introducing a mobility control fluid bank to drive the now mobilized oil towards the producing well. The viscosity of the fluids which were injected are graded from a low viscosity at the front thereof to a higher viscosity at the rear thereof, thus preventing the formation of viscous zones within the injected fluids. This grading of the viscosity may take place within the first fluid bank only, the mobility control fluid bank only or across all of the injected banks of fluid.

DETAILED DESCRIPTION OF THE PREFERRED EMBODIMENT

Figure 1:
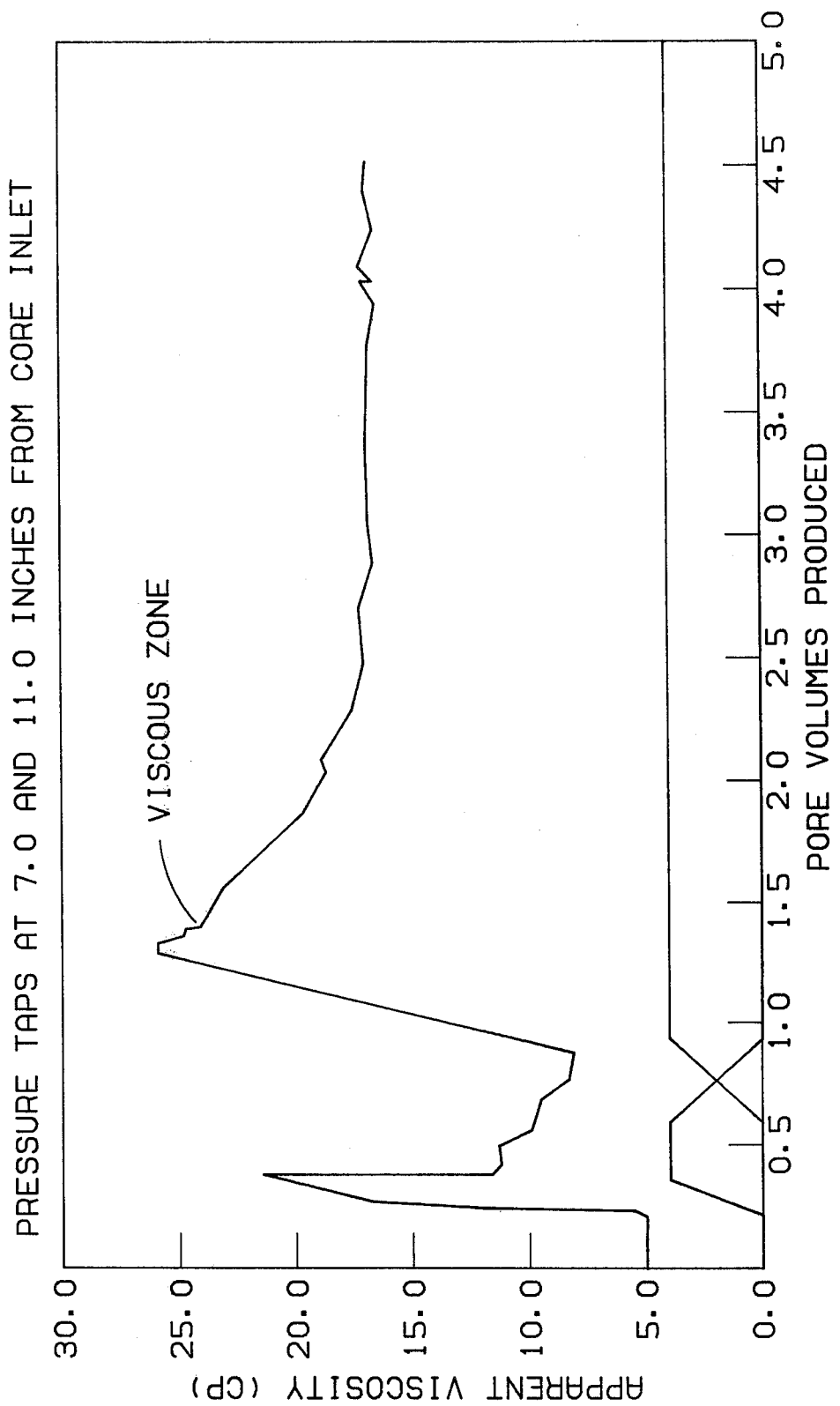
FIG. 1 graphically illustrates a high viscosity zone generated within a micellar fluid due to polymer build up.

The present invention is applicable to fluid flooding to recover oil from an underground formation wherein a first fluid is introduced into the formation to reduce the interfacial tension of the in-place oil followed by the introduction of a mobility control fluid to drive the displaced oil to a production well. Most typically this type of flooding is called micellar flooding where a mobility control agent which provides viscosity necessary to drive the fluid is provided by a biopolymer or polyacrylamide.

In a typical micellar flooding process a preflush slug of water is injected into the formation. This preflush fluid is usually of a low salinity and, if desired, may contain a sacrificial agent to reduce loss of the surface active agent or surfactant to the formation. Next a slug of fluid, such as what is normally called a micellar fluid, containing surface active agents or surfactants is injected into the formation. The micellar slug is equal to about 0.1 to about 0.75 or more pore volume of the formation, and the surfactant concentration generally will be from about 0.05 to about 11 or more percent by weight. The micellar fluid may or may not contain a water soluble polymer to provide a certain amount of mobility control or pushability of the oil. The micellar fluid slug thereafter is followed by the introduction of a mobility control fluid into the formation. This fluid usually contains a certain concentration of lyophilic polymer which is a water soluble polymer. One polymer usually used is an ionic polysaccharide produced by bacteria of the genus Xanthamonus. Many other such water soluble polymers may be used within this invention. The mobility control fluid slug is equal in volume to about 0.5 to about 0.9 or more pore volume of the formation and contains a certain polymer concentration, from about 0 ppm to about 2500 ppm.

It has been found that when the polymer, such as a biopolymer, is added to the micellar fluid, a viscous zone is generated within the micellar bank. This is because the polymer does not interact with the oil and cannot penetrate into the mobilized oil-water bank. As a result, polymer concentration is built up or accumulated behind the mobilized oil-water bank and thus generates a high viscosity zone due to the higher concentration of the polymer. This high viscosity zone or viscous zone is usually followed by the stabilized micellar bank and the mobility control bank. The viscosity of these banks have been designed based on a lack of occurrence of a viscous zone. Hence, this creates a mobility control problem because the less viscous fluid will tend to bypass or channel through the more viscous fluid, and the more viscous fluid will slow down and may eventually become trapped.

To correct this polymer build up, it has been proposed within the present invention to inversely grade the viscosity of the injected fluids. More specifically, it has been proposed to inversely grade the polymer concentration within the micellar fluids. By grading the polymer concentration of the micellar bank from a low concentration at the front thereof to a higher concentration at the rear thereof, the polymer build up may be used to advantage by generating the viscosity needed within the micellar bank, but more importantly, any viscous zones will be prevented thus the integrity of the mobility control of the flood will be preserved.

The mobility control fluid concentration depends upon many field variables but the polymer concentration may be graded from about 0 ppm to about 2500 ppm. Preferably, the polymer concentration may be graded from about 0 ppm to about 1000 ppm, and most preferably from about 0 ppm to about 800 ppm.

It should be noted that the viscosity may be graded across all of the injected fluids. For example, the first fluid may have a polymer concentration graded from about 0 ppm to about 200 ppm at the interface with the mobility control fluid. And, the polymer concentration of the mobility control fluid bank would be graded from 200 ppm to about 1000 ppm.

To illustrate the effectiveness of the present invention, the following tests were conducted. First, an explanation of the core test procedure is presented. A core is prepared by wrapping and installing pressure-tabs as is common practice in the industry. The core is then saturated with injection water saturated with $CaSO_4$. Crude oil is then injected to reduce the cores connate water saturation. Next, brine is injected to reduce the fluid saturation of the core to a residual oil saturation, as by secondary water flooding. Finally, a micellar fluid is injected into the core.

In the first test, a 1 ft Berea sandstone core was prepared as described above and saturated with Torchlight Field crude oil. A fluid slug at 100° F. was continuously injected into the core. The micellar fluid bank contained an Xanthan polymer at 900 ppm. As shown in FIG. 1, the effective viscosity (measured in centipoise) of the micellar fluid rose to a peak of 26 cp at 1.25 pore volumes produced. This is 50% or more in excess of the stabilized mobility fluid bank. The single high peak on the graph in FIG. 1 indicates the formation of a viscous zone. The effluent produced from this core, specifically from this viscous zone, was cloudy and contained a much higher polymer concentration than that which was injected. This polymer build-up within the core can be differentiated from the so-called "concentrate" effect of the polymer resulting from the formation of "upper" and "middle" phase microemulsions. The concentrating effect is caused by upper and middle microemulsions taking up brine and excluding the high molecular weight polymer molecules. However, in this test, the viscous zone occurred inside the micellar bank where both micellar tracer and surfactant had reached their injected values.

Figure 2:
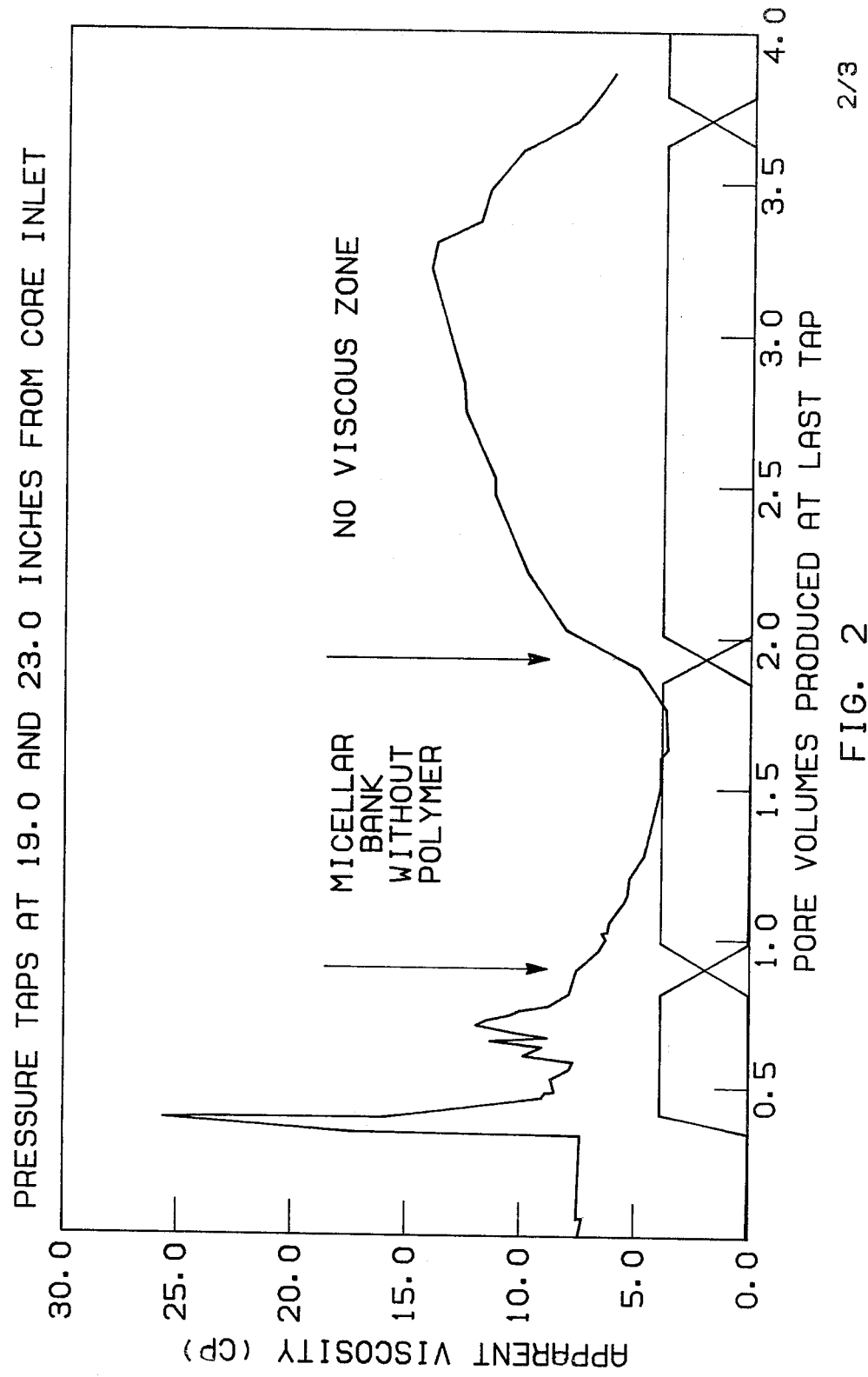
FIG. 2 graphically illustrates the absence of adverse viscous zones by eliminating any polymer from the micellar fluid.

A second test was conducted and is illustrated in FIG. 2. In this test, a 2 ft Berea core was prepared with Torchlight Field crude oil in the same manner as described above. A large slug of micellar fluid was injected into the core. The micellar fluid did not contain any polymer. As the graph in FIG. 2 shows, there was not a single high peak or ridge which indicated the formation of a viscous zone; however, the mobility control was totally lacking between the oil-water and micellar banks.

Figure 3:
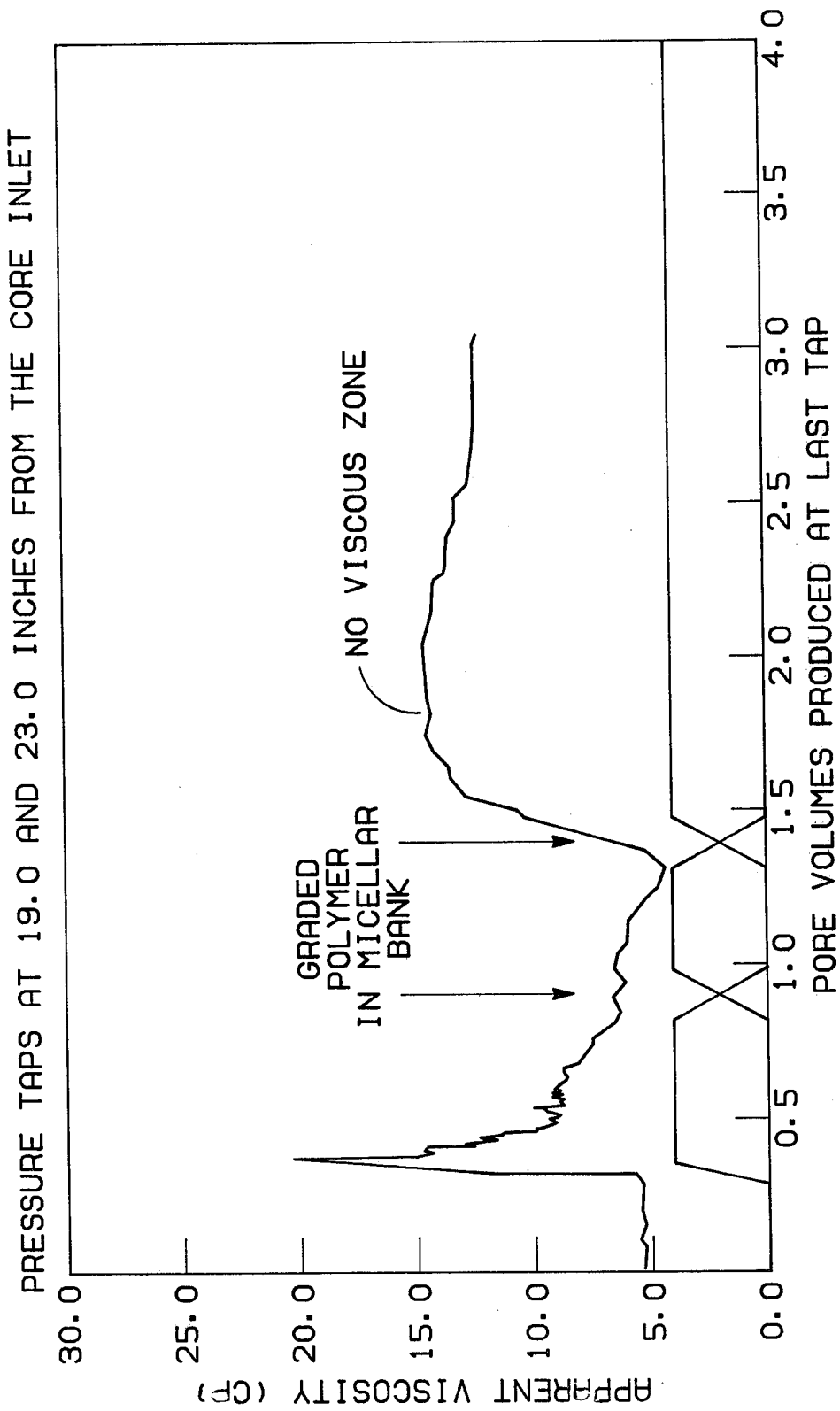
FIG. 3 graphically illustrates the elimination of adverse viscous zones by inversely grading the viscosity of the micellar fluid for a low viscosity at the front thereof to a higher viscosity at the rear thereof.

A final test was conducted to show the advantages of the present invention and the results are shown in FIG. 3. A 2 ft Berea core was prepared identically to the test illustrated in FIG. 2. The micellar fluid composition was essentially identical, but with the addition of an Xanthan polymer graded from 0 ppm to 800 ppm in accordance with the present invention. The results illustrated in the graph of FIG. 3 do not show a high peak of viscosity thus indicating the prevention of any polymer build-up within the micellar fluid bank. In fact, the viscosity of the produced fluid never increased above 18 cp. It can be seen from the above test that the inverse polymer grading in accordance with the present invention totally prevented or dramatically reduced any viscous zones, thereby allowing for better mobility control within a micellar flood and thus reducing the amount of polymer entrapment within the formation.

Whereas the present invention has been described in particular relation to the drawings attached hereto, it should be understood that other and further modifications, apart from those shown or suggested herein, may be made within the scope or spirit of this invention.

We claim:

1. A method of fluid flooding to increase oil recovery from a subterranean oil-bearing formation penetrated by an injection well and a production well, comprising grading the viscosity of all injected fluids in the fluid flood from a given viscosity at the initiation of the fluid flood to a higher viscosity at the end of the fluid flood to prevent the formation of viscous zones within the injected fluids.

2. A method of oil recovery from a subterranean oil-bearing formation penetrated by an injection well and a producing well, comprising introducing a bank of micellar fluid into the formation and introducing a bank of mobility control fluid into the formation, wherein the mobility control agent in the micellar bank is graded from a low concentration at the front thereof to a higher concentration at the rear thereof.

3. A method of micellar flooding wherein viscous zones within the injected fluid are prevented, comprising injecting a bank of aqueous micellar fluid into the formation and thereafter injecting a bank of mobility control fluid into the formation, said micellar fluid and said mobility control fluid having a graded polymer concentration from a low concentration adjacent to the front of the micellar fluid bank to a higher concentration adjacent the rear of the mobility control fluid.

4. The method of claim 3 wherein the polymer concentration is graded from about 0 ppm to about 2500 ppm.

5. The method of claim 3 wherein the polymer concentration is graded from about 0 ppm to about 1000 ppm.

6. The method of claim 3 wherein the polymer concentration is graded from about 0 ppm to about 800 ppm.

* * * * *